US011015916B2

United States Patent
Am Weg et al.

(10) Patent No.: US 11,015,916 B2
(45) Date of Patent: May 25, 2021

(54) DISTANCE MEASURING ARRANGEMENT FOR DETERMINING A DISTANCE FROM AN OBJECT

(71) Applicant: TAYLOR HOBSON LTD., Leicester (GB)

(72) Inventors: Christian Am Weg, Darmstadt (DE); Thilo May, Darmstadt (DE); Jürgen Petter, Griesheim (DE); Peter Eiswirt, Mainz (DE); Sucheta Sharma, Darmstadt (DE)

(73) Assignee: TAYLOR HOBSON LTD., Leicester (GB)

( * ) Notice: Subject to any disclaimer, the term of this patent is extended or adjusted under 35 U.S.C. 154(b) by 0 days.

(21) Appl. No.: 16/613,022

(22) PCT Filed: May 9, 2018

(86) PCT No.: PCT/EP2018/062150
§ 371 (c)(1),
(2) Date: Nov. 12, 2019

(87) PCT Pub. No.: WO2018/206731
PCT Pub. Date: Nov. 15, 2018

(65) Prior Publication Data
US 2020/0200523 A1 Jun. 25, 2020

(30) Foreign Application Priority Data
May 12, 2017 (EP) .................................... 17170788

(51) Int. Cl.
*G01B 11/02* (2006.01)
*G01B 9/02* (2006.01)
*G02F 1/313* (2006.01)

(52) U.S. Cl.
CPC .......... *G01B 11/026* (2013.01); *G01B 9/0201* (2013.01); *G01B 9/02007* (2013.01); *G01B 9/02024* (2013.01); *G02F 1/3133* (2013.01)

(58) Field of Classification Search
CPC .............. G01B 9/02007; G01B 9/0201; G01B 9/02024; G01B 11/026
See application file for complete search history.

(56) References Cited

U.S. PATENT DOCUMENTS

| 6,611,338 B1 | 8/2003 | Knuttel et al. |
| 2004/0179202 A1* | 9/2004 | Sezginer ............ G01B 9/02069 356/451 |

(Continued)

FOREIGN PATENT DOCUMENTS

| DE | 10 2008 033942 B3 | 4/2010 |
| DE | 10 2015 209567 B3 | 10/2016 |

(Continued)

OTHER PUBLICATIONS

International Search Authority European Patent Office (ISA/EP), International Search Report, International Application No. PCT/EP2018/062150, dated Jun. 7, 2018, 2 pages, Rijswijk, NL.

(Continued)

*Primary Examiner* — Michael A Lyons
(74) *Attorney, Agent, or Firm* — Christopher C. Dremann, P.C.; Christopher C. Dremann

(57) ABSTRACT

A distance measuring arrangement for determining a distance from an object includes at least one light source for producing at least one first monochromatic and interference-capable light beam with a first wavelength and at least one second monochromatic and interference-capable light beam with a second wavelength, a multiplexer for coupling or combining the at least one first light beam and the at least one second light beam into a common measurement beam, an output coupling element for splitting the measurement (Continued)

beam into a reference beam and a signal beam, wherein the reference beam propagates along a reference path and wherein the signal beam propagates along a signal path, and a phase modulator that is arranged in the signal path and configured to modulate the phase of the signal beam periodically in time.

17 Claims, 7 Drawing Sheets

(56) References Cited

U.S. PATENT DOCUMENTS

| | | | | |
|---|---|---|---|---|
| 2004/0239938 A1* | 12/2004 | Izatt | ............... | G01B 9/02004 |
| | | | | 356/479 |
| 2014/0368828 A1* | 12/2014 | Lloret Soler | ........ | G01B 9/0201 |
| | | | | 356/479 |
| 2015/0177132 A1* | 6/2015 | Pechstedt | ............... | G01N 33/22 |
| | | | | 356/517 |
| 2016/0109734 A1 | 4/2016 | Porte et al. | | |

FOREIGN PATENT DOCUMENTS

| | | |
|---|---|---|
| JP | H08-271215 A | 10/1996 |
| JP | 2006-003619 A | 1/2006 |
| WO | 2009/071930 A1 | 6/2009 |

OTHER PUBLICATIONS

The International Bureau of WIPO, International Preliminary Report on Patentability, Written Opinion of the International Search Authority (ISA/EP), International Application No. PCT/EP2018/062150, dated Nov. 12, 2019, 7 pages, Geneva, Switzerland (CH).

Japan Patent Office (JPO), , Notice of Reasons for Rejection (Office Action) , dated Dec. 1, 2020, 6 pages.

* cited by examiner

A-A

DISTANCE MEASURING ARRANGEMENT FOR DETERMINING A DISTANCE FROM AN OBJECT

The present invention relates to a distance measuring arrangement for determining a distance from an object, an associated measuring head and a method for determining a distance from an object, as well as a computer program for determining a distance from an object.

BACKGROUND OF THE INVENTION

DE 10 2008 033 942 B3 has disclosed a fiber-optic multi-wavelength interferometer for measurement of distances and topologies of surfaces at a large working distance. Said interferometer comprises an optical multi-wavelength sensor, based on a fiber-optic concept, comprising two or more lasers whose wavelengths lie in the optical telecommunications range. Here, a sensor head is periodically modulable in space in the direction of a measurement beam. The optical signals of the employed lasers are combined in a common fiber by multiplexers and guided to the sensor head.

Here, the spatial modulation of a measurement beam is implemented by means of a piezo actuator, which consequently represents a movable component of the sensor. Appropriate mechanical movements should be applied in the sensor for the periodically spatial modulation of the measurement beam. These are limited in respect of amplitude and frequency for mechanical reasons. Moreover, mechanically moving component parts or components of the sensor invariably produce vibrations which, under certain circumstances, may lead to technical measurement problems and/or to an audible development of noise, which may sometimes be perceived as bothersome.

OBJECTS OF THE INVENTION

In relation thereto, it is an object to provide an improved distance measuring arrangement for determining a distance and/or for quantitatively capturing distances from surfaces and/or topologies of surfaces, which is implementable without mechanically moving components where possible, which develops less noise, and which is comparatively easy to implement and actuate from an apparatus-technical point of view. It is further an object to improve the precision and accuracy of distances to an object, to be measured by means of the distance measuring arrangement, or of a surface topology of the object to be ascertained.

SUMMARY OF THE INVENTION

This object is achieved by a distance measuring arrangement, a method for determining a distance from an object and by a computer program as disclosed by the exemplary embodiments described hereinafter and shown in the accompanying drawing figures.

In this respect, provision is made of a distance measuring arrangement for determining a distance from an object. The distance measuring arrangement comprises at least one first light source for producing at least one first monochromatic light beam, capable of interference, with a first wavelength. Further, the light source is configured to produce at least one second monochromatic light beam, capable of interference, with a second wavelength. The first and the second wavelength differ. Further, the light source may be configured to produce further monochromatic light beams, for example third and/or fourth monochromatic light beams, which are capable of interference in each case. Preferably, the light source is configured to produce monochromatic light beams, capable of interference, in the optical telecommunications range of between 1520 nm and 1630 nm or to produce wavelengths that may lie in the so-called S-, C- or L-band.

Further, the distance measuring arrangement comprises a multiplexer for coupling or combining or superposing the at least first light beam and the at least second light beam in a common measurement beam. By means of the multiplexer, the at least first light beam and the at least second light beam can be combined with one another or superposed on one another to form a common measurement beam. Consequently, the measurement beam contains spectral components of the first wavelength and of the second wavelength. The first light beam and the second light beam are superposed in the common measurement beam. In the common measurement beam, the at least first light beam and the at least second light beam propagate in parallel and in virtually complete transversal coverage.

If the light source is configured to produce a plurality of light beams with different wavelengths, i.e., up to three, four or even more further light beams, these are likewise coupled into or superposed on the common measurement beam using the same multiplexer. That is to say, the measurement beam may contain at least two light beams of different wavelengths but may also contain three or four or even more light beams of different wavelengths, or said measurement beam may be formed by a superposition of such light beams with different wavelengths.

Further, the distance measuring arrangement comprises an output coupling element for splitting the measurement beam produced by the multiplexer into a reference beam and into a signal beam. Here, the reference beam propagates along a reference path. Here, the signal beam propagates along a signal path. The reference path and the signal path are separated from one another by means of the output coupling element. Typically, the signal path extends from the output coupling element to the object. Typically, the signal beam is reflected at the object. Typically, the reflected signal beam propagates back along the signal path. Typically, the signal path and the reference path are unified again by means of an input coupling element such that the reference beam and the signal beam that has been reflected by the object can be brought into interference with one another. The detector arrangement renders the interfering beams, specifically the reference beam and the signal beam that has been reflected by the object, capturable in interferometric and/or wavelength-selective fashion.

Further, the distance measuring arrangement comprises a phase modulator that is arranged in the signal path and that is configured to modulate the phase of the signal beam periodically in time. A periodic modulation in time facilitates an unchanging modulation or a modulation correspondingly following a predetermined function of time, i.e., a change in phase of the signal beam over time.

Consequently, there is also change in the interference of the reflected signal beam and the reference beam in accordance with the periodic modulation of the phase of the signal beam in time. This simplifies and refines the interferometric and/or wavelength-sensitive capture and evaluation of an interference signal that emerges from a superposition of the reference beam and the signal beam that has been reflected by the object. The periodic modulation of the phase of the signal beam in time is typically implemented by a controller of the distance measuring arrangement.

A detector arrangement for interferometric and/or wavelength-selective capture of the evaluation beam, i.e., of the superposition of the reference beam and of the signal beam that has been reflected by the object can ascertain an intensity of the interference pattern, averaged over time, by way of the periodic modulation of the phase of the signal beam in time. The detection of the intensity averaged over time allows accurate and precise conclusions to be drawn about the relative phase of the reflected signal beam with respect to the phase of the reference beam at the location of the detector arrangement. This allows possible external disturbing influences and also tolerances of a phase measurement caused by measurement technology to be compensated by calculation.

The relative phase between the reflected signal beam and the reference beam can be ascertained with increased accuracy by virtue of the phase of the signal beam being periodically modulated, i.e., being changed in time in accordance with a predetermined continuously recurring function, by means of a phase modulator. This improves the accuracy of the determination of the distance from an object. The distance from the object to be measured emerges from the relative phase between the reference beam and the signal beam that has been reflected by the object.

Since the phase modulator has no mechanically moving components, the phase of the signal beam can be modulated with a comparatively high frequency. Provision can be made for the phase modulator to be embodied to modulate the phase of the signal beam with a frequency above 1 kHz, with a frequency above 2 kHz, with a frequency above 3 kHz, with a frequency above 5 kHz or with a frequency of more than 10 kHz, 50 kHz or 100 kHz. Such a fast phase modulations may contribute to a further improvement in the precision and measurement speed of the distance measurement.

Moreover, the amplitude of the phase modulation by means of the phase modulator can be increased by a predetermined amount. Phase modulation of significantly more than $2\pi$, $4\pi$, $6\pi$, $8\pi$ and beyond are obtainable.

By way of example, the periodic modulation in time may include a sinusoidal modulation. Further, sawtooth-shaped or rectangular modulations of the phase are conceivable. In particular, the phase modulator is configured to modulate, i.e. change, the phase of the signal beam in a continual and continuous fashion.

In particular, the phase modulator can be configured to periodically modulate in time both the signal beam that has been branched off from the measurement beam and the signal beam that has been reflected by the object. If the signal beam directed to the object and the signal beam that has been reflected by the object pass through the phase modulator in opposing directions, the phase modulation of the signal beam or of the reflected signal beam can be further increased in relation to the reference beam.

According to a further configuration of the distance measuring arrangement, the phase modulator comprises an electro-optic modulator EOM. In particular, the electro-optic modulator is electrically actuatable. The phase of the signal beam or the phase of the reflected signal beam can be modulated or changed over time in a targeted manner by means of the electro-optic modulator with the aid of electrical control signals of an actuation of the distance measuring arrangement. The electro-optic modulator can be configured to modulate the phase of the signal beam or the phase of the reflected signal beam by exploiting the Pockels effect or the Kerr effect. An electro-optic modulator can be configured as a DC electro-optic modulator or as an RF electro-optic modulator.

As an alternative thereto, the phase modulator may also comprise an acousto-optic phase modulator or may be configured as the latter. Additionally, the phase modulator may comprise a liquid crystal cell as a phase-modulating component part.

According to a further configuration, the phase modulator can be configured as a current injection phase modulator or as a thermo-optic phase modulator. Current injection phase modulators are likewise based on the electro-optic effect. However, it is induced by a current injection. Current injection phase modulators are distinguished by an increased efficiency to the detriment of the modulation speed.

Thermo-optic phase modulators are based on the change in the refractive index as a function of the temperature. Temperature can be implemented by a current feed into heating elements that are arranged on, next to and/or along a waveguide of the phase modulator. Thermo-optic phase modulators can be implemented, for example, as a photonic integrated circuit. By way of example, such phase modulators can be implemented on the basis of indium phosphide (InP), gallium arsenide (GaAs), silicon nitride (SiN) or on the basis of silicon on insulator (SOI).

In order to obtain a 180° phase shift, it is necessary to induce 0.5 W into an SiN-based thermo-optic phase modulator. InP-based or SOI-based thermo-optic phase modulators have a far higher efficiency in view of the phase shift and/or a refractive index change. These are approximately comparable for InP-based and SOI-based phase modulators.

According to a further configuration, the electro-optic modulator comprises a crystal body and at least two electrically actuatable electrodes that have an electrical connection to the crystal body. Typically, the electrodes are electrically connected to a controller of the distance measuring arrangement. The controller is configured to provide a voltage or an electric current that corresponds to a phase modulation to be undertaken at the electrodes such that the crystal body changes its refractive index, depending on the respective prevalent electric field that is applied by way of the electrodes.

The phase of the signal beam propagating through the crystal body and/or the phase of the signal beam reflected at the object is modulable according to requirements by way of the electrically induced refractive index change of the crystal body. The refractive index change of the crystal body can vary, virtually without delay, with the electric field applied to the crystal by way of the electrodes. In this respect, comparatively high modulation frequencies in the range above at least 1 kHz, but also above 10 kHz, can be realized without problems.

According to a further configuration, the crystal body has an anisotropic crystal structure. In particular, the crystal body may have a birefringent configuration. It may have different refractive indices along different crystal axes. The refractive index or the different refractive indices can be varied by way of applying an electric field for the purposes of obtaining a phase change or phase modulation.

According to a further configuration, the crystal body is not inversion symmetric. In particular, the crystal body belongs to the class of crystals that exhibit the linear electro-optic effect, also referred to as the Pockels effect. A change in the refractive index or a change in the birefringence changes linearly with the change in the electric field applied to the crystal body. According to a further configuration, the crystal body may comprise a photorefractive crystal. Photorefractive crystals change their refractive index locally depending on the light intensity acting on the crystal.

According to a further configuration, the crystal body comprises a lithium niobate crystal, a potassium dihydrogenphosphate crystal or gallium arsenide crystal. Lithium niobate crystals are particularly well suited to the implementation of an electro-optic modulator, more particularly a phase modulator.

According to a further configuration, the crystal body comprises a waveguide. The latter can be diffused into the crystal structure of the crystal body. The waveguide introduced by diffusion can be introduced into the crystal body, for example into a lithium niobate crystal, by titanium diffusion or by proton exchange. The waveguide need not be configured as a diffused-in waveguide. By way of example, it may also be produced by doping in a III-V semiconductor.

The waveguide serves for controlled transfer through the crystal body of the signal beam and/or of the signal beam that has been reflected by the object. An uncontrolled divergence of the signal beam during its propagation through the crystal body can be avoided by way of the waveguide. The transverse extent of the signal beam remains largely constant during its propagation through the waveguide.

It is also possible to reduce to a minimum possible intensity losses of the signal beam, of the signal beam directed to the object and/or the signal beam reflected by the object.

According to a further configuration, the electro-optic modulator is operated in transverse geometry, in particular. That is to say, the electrically actuatable electrodes lie on an external surface, or on opposing external surfaces, of the crystal body in the transverse direction with respect to the beam propagation through the crystal body. In principle, it is conceivable for the two electrodes to lie on opposing external sides of the crystal body such that the electric field lines between the electrodes extend transversely through the crystal body, i.e., perpendicular to the direction of propagation of the signal beam.

According to a further configuration, the electrodes lie on a common surface of the crystal body. By way of example, they can lie on a common top side of the crystal body. The two electrodes typically lie on the same surface of the crystal body. Such an arrangement may be advantageous, particularly in combination with the waveguide that extends through the crystal body. This can ensure that the electric field lines extending between the electrodes cross the waveguide in the transverse direction.

According to a further configuration, the waveguide adjoins the surface of the crystal body on which the electrodes lie. Further, the waveguide extends along the surface of the crystal body. A near-surface arrangement of the waveguide can be implemented comparatively easily from a manufacturing point of view. This applies, in particular, if the waveguide is produced by diffusion, for example diffusion of titanium, or by proton exchange. In particular, provision is made for the electrodes to lie on the same side of the crystal body as the one on which the waveguide also extends. What this can achieve is that the electric field lines extending, e.g., in arcuate fashion between the electrodes extend in transverse fashion through the waveguide. Consequently, a required refractive index modulation, which is able to be altered proportionally with the voltage applied to the electrodes, can be produced in the waveguide.

According to a further configuration, the electrodes extend parallel to one another. Further, they extend parallel to the longitudinal direction of the waveguide. Consequently, the electrodes extend along the surface of the crystal body in the longitudinal direction of the waveguide. A parallel extent of the electrodes both to one another and to the waveguide facilitates the formation of a constant electric field along the waveguide. This allows a refractive index change or phase modulation to be modified and controlled particularly well by the applied voltage.

According to a further configuration, the waveguide is arranged between a first electrode and a second electrode. Consequently, provision is made for a symmetric arrangement of the waveguide between the electrodes, for example. The waveguide can be situated approximately centrally between the two electrodes. Asymmetric configurations, where the waveguide is arranged closer to the first electrode than to the second electrode, or vice versa, where the waveguide is arranged closer to the second electrode than to the first electrode, are likewise conceivable.

According to a further configuration, the distance measuring arrangement further comprises a measuring head, in or on which the phase modulator is disposed. In particular, provision is made for the phase modulator to be placed as close to the object as possible. The signal beam or the signal beam that has been reflected by the object can propagate freely between the phase modulator and the object. The free propagation path of the signal beam and/or of the signal beam that has been reflected by the object can be reduced to a minimum by virtue of disposing the phase modulator in a measuring head that is aligned toward the object to be measured. This can minimize possible external disturbing influences.

According to a further configuration, the measuring head is coupled in fiber-optic fashion to the multiplexer. Further, the link of the measuring head to the light source can likewise be embodied in fiber-optic fashion. The light source can be coupled to the multiplexer in fiber-optic fashion. Further, the multiplexer can be coupled to the measuring head in fiber-optic fashion. The output coupling element, too, can have a fiber-optic implementation such that the at least first and the at least second light beam, the measurement beam formed therefrom and also the reference beam are entirely guided within one or more optical fibers.

Only the signal beam coupled out of the measurement beam and the signal beam that has been reflected by the object can propagate freely. The output coupling element may likewise be integrated into the measuring head such that a division of the measurement beam into the reference beam and into the signal beam is only implemented in the measuring head itself. This facilitates comparatively simple and unrestricted handling of the measuring head. On account of its fiber-optic coupling to the multiplexer, the light source and to a detector arrangement, said measuring head can be moved freely in space without this having a disadvantageous effect on the interferometric and/or wavelength-selective capture of the evaluation beam.

According to a further configuration, the phase modulator is coupled to the multiplexer in fiber-optic fashion. In addition or as an alternative thereto, the phase modulator can be coupled directly to a fiber guiding the signal path and/or the reference beam and can be mechanically connected to said fiber. Thus, for example, a fiber end facing the phase modulator can be directly mechanically connected to the phase modulator. The relevant fiber end and the phase modulator can be connected to one another by means of an adhesive, for example. The adhesive can be a so-called index matching adhesive, which brings about index matching between the fiber and the phase modulator, in particular between the fiber and a waveguide of the phase modulator.

Free beam propagation between the fiber end and the phase modulator is avoided by direct coupling of the fiber end and phase modulator. This may be advantageous, both from an assembly point of view and also for maintenance purposes. Additionally, possible input coupling and output coupling losses can be reduced in the transition between the fiber and phase modulator. This may lead to an improvement in the signal quality and/or signal evaluation.

The direct optical coupling between the fiber end and the phase modulator is suitable, in particular, for miniaturizing the distance measuring arrangement, in particular the measuring head, in which both, the fiber end and the phase modulator, are disposed. Direct coupling of the fiber to the phase modulator further facilitates the use of integrated optical components and/or an optically integrated configuration of the phase modulator in the measuring head.

According to a further configuration of the distance measuring arrangement, the measuring head comprises an optical unit, by means of which the signal beam is directable to the object and/or a signal beam that has been reflected by the object is couplable into the measuring head. Advantageously, the optical unit is configured both to apply the signal beam on the object and to couple the signal beam that has been reflected by the object into the measuring head. Consequently, the measuring head and its optical unit are configured to measure the distance between the measuring head and the object using reflection geometry. The use and implementation of only a single optical unit, for example a collimation lens, facilitates a positioning of the measuring head relative to the object that is easy to handle from a practical point of view. The optical unit can be used to place the measuring head at a practical distance from the object, for example at a distance of several centimeters, such that a contact between the measuring head and the object can be reliably precluded for the purposes of measuring the distance or for the purposes of scanning the surface of the object for the purposes of measuring its surface and/or topology of the object surface.

According to a further configuration, the phase modulator comprises an end face, facing the optical unit, with a surface normal that is aligned in inclined fashion in relation to an optical axis of the optical unit. A clear space can be situated between the relevant end face of the phase modulator and the optical unit. As a result of the inclined alignment of the exit face or of the end face of the phase modulator in relation to the optical axis of the optical unit, a back reflection of the signal beam that emerges from the end face in the direction of the optical unit, said back reflection invariably arising at the end face, can be reflected back into the phase modulator at a predetermined inclination angle in relation to the optical axis. Consequently, the back reflection is located away from the signal beam that has been reflected back from the object and that has been coupled into the phase modulator. Consequently, an impairment of the measurement signal or of the signal beam by way of a back reflection at the output of the phase modulator can be effectively avoided or reduced.

The angle of inclination between the surface normal and the optical axis is typically between 3° and 10°. It may be between 4° and 8°, alternatively between 4° and 6°. Preferably, the angle of inclination is approximately 5°.

Provision can be made for the phase modulator as such to have a cubic or rectangular geometry and to be likewise aligned in inclined fashion with respect to the longitudinal extent of the housing of the sensor head, in accordance with the angle of inclination between the surface normal of the end face inclined towards the optical unit and the optical axis of the optical unit. Expressed differently, the phase modulator may have a geometry with a longitudinal extent and may be aligned in inclined fashion with respect to the optical axis of the optical unit in accordance with the specified angle of inclination. On account of the inclined exit face of the phase modulator, the optical axis within the measuring head has a geometric kink in the region of the exit face of the phase modulator.

The surface normal of the exit face or end face of the phase modulator facing the optical unit can be aligned in inclined fashion with respect to a longitudinal axis of the phase modulator, for instance its crystal body or its layer structure. The angle of inclination between the longitudinal axis of the phase modulator and the surface normal of the exit face can be substantially identical to the angle of inclination between the surface normal and the optical axis of the downstream optical unit.

According to a further configuration, the phase modulator is disposed between the output coupling element and the optical unit in the signal path. Provision can be made for the output coupling element to be disposed directly at the input of the phase modulator in order, for example, to directly couple the signal beam, which has been coupled out of the measurement beam by the output coupling element, into the phase modulator as loss-free as possible. However, it is also conceivable for the signal beam that has been coupled out of the measurement beam by way of the output coupling element to propagate freely over a certain path and, for example, be coupled into an end of the waveguide of the crystal body facing the output coupling element.

According to a further configuration of the distance measuring arrangement, the latter comprises an input coupling element, by means of which the reference beam and the signal beam that has been reflected by the object are combinable with one another to form an evaluation beam. The reference beam and the reflected signal beam are superposable in space, in particular, such that these two beams are capturable or detectable in co-propagating fashion by a detector arrangement. The evaluation beam formed by the reference beam and the reflected signal beam forms an interference pattern that changes with distance between the output coupling element and the object. Measuring the interference or capturing data of the interference between the reference beam and the signal beam that has been reflected by the object allows the distance to be determined between the output coupling element and the surface of the object that has reflected the signal beam.

According to a further configuration, the distance measuring arrangement further comprises a detector arrangement for interferometric and/or wavelength-selective capture of the evaluation beam. In particular, the detector arrangement may comprise a demultiplexer, by means of which the at least first and the at least second light beam having different wavelengths are separable from one another. The reference beam comprises at least a first and a second partial reference beam having respectively a first wavelength and a second wavelength. The same applies to the signal beam and to the signal beam that has been reflected by the object. A partial signal beam having the first wavelength interferes with the partial reference beam having the first wavelength. The partial signal beam having the second wavelength interferes with the partial reference beam having the second wavelength, etc. Third and fourth partial signal beams having third and fourth wavelengths, which differ from the first and second wavelengths, can also respectively interfere with third and fourth partial reference beams having third and fourth wavelengths.

The demultiplexer and the downstream detector arrangement allows the corresponding evaluation beams, and consequently the different spectral components of the evaluation beam, to be captured separately and hence wavelength-selectively. In this respect, the detector arrangement may comprise a plurality of optical detectors, for example photodiodes or similar optically sensitive sensors, which are each embodied to detect the interference of the evaluation beam in respect of a predetermined wavelength.

The distance measuring arrangement may have a comparatively large measurement range as a result of the simultaneous interferometric and/or wavelength-selective capture of a multiplicity of different wavelengths or spectral components of the evaluation beam. The combination of a plurality of interference patterns on the basis of different wavelengths increases the measurement range of the distance measuring arrangement to several centimeters. In this respect, the distance measuring arrangement can be configured as a heterodyne interferometer.

A plurality of light beams having different wavelengths are provided for ascertaining the distance from an object. However, the interferences of the individual light beams are measured and detected separately. For the purposes of determining the distance from the object, the individual interferences that have been measured on the basis of different wavelengths are combined with one another.

According to a further configuration, the measuring head comprises a temperature sensor. In particular, the temperature sensor can be signal-connected to a detector arrangement or to a controller of the distance measuring arrangement. Possible influences of the temperature can be measured by means of the temperature sensor. Measuring the temperature facilitates a temperature-sensitive or temperature-dependent distance measurement. By way of example, a computational compensation of possible temperature effects can be implemented by means of the temperature measurement.

By way of example, the temperature sensor may comprise a Bragg grating, more particularly a fiber Bragg grating, for example in order to be able to measure a temperature change in the phase modulator during operation. The temperature sensor may be thermally coupled to the phase modulator and/or to the housing of the measuring head.

Either the measured temperature change can be compensated by calculation or the sensor head can be provided with a cooling and/or heating element, for example a Peltier element, which is actuatable by the controller of the distance measuring arrangement in accordance with the measured temperature. In this respect, the controller can be configured to regulate the temperature of the measuring head as a function of the temperature measured at the phase modulator, in particular to keep said temperature constant.

According to a further configuration, the phase modulator comprises a plurality of layers of n-doped and/or p-doped semiconductor materials, more particularly InP, InGaAs, SiN or silicon on insulator. Such semiconductor materials facilitate a further miniaturization of the phase modulator. The individual semiconductor layers can be disposed on a carrier substrate for the purposes of forming the phase modulator, in particular by means of conventional coating methods, for instance chemical vapor deposition (CVD), plasma enhanced chemical vapor deposition (PECVD) and/ or by means of sputtering or the like.

In particular, the phase modulator may have a combination of various III-V materials, i.e., materials of main group 3 and 5, for example a combination of a plurality of plies of InP and InGaAs, each with different doping (n and p) and with different doping densities. By way of example, the phase modulator may have a III-V semiconductor junction for providing an electro-optic effect, which then causes a modulation in the refractive index of the relevant layers by way of an applied voltage, for example by contacting from above and from below or from the side.

The use of a phase modulator on the basis semiconductor materials facilitates integrated manufacturing of the phase modulator and its link to a fiber. Thus, the phase modulator may be provided by a photonic integrated circuit or may be integrated into a photonic integrated circuit. Semiconductor materials further facilitate the provision of a phase modulator in the form of a chip, for example an integrated optic and/or photonic chip, which may act as a component for an integrated optical configuration of the phase modulator or of the measuring head. The photonic integrated circuit and/or the phase modulator can be present in the form of a photonic chip.

The specified semiconductor materials may already provide a relatively large refractive index modulation when applying a comparatively low voltage. In the case of a semiconductor material-based phase modulator with a length of approximately 2-3 mm, a voltage of 5-8 V may already suffice for phase shift of 180°. Comparable effects with lithium niobate require a crystal that is longer by approximately a factor of 3 to 4.

In particular, the phase modulator can be configured as a photonic integrated structure. The phase modulator provided on semiconductor basis can further comprise a waveguide or wave-guiding structure, which extends along the longitudinal direction of the phase modulator.

According to a further configuration, a spot-size converter can be provided, particularly for a phase modulator based on semiconductor technology, said spot-size converter being disposed between the fiber end facing the modulator and the input side of the phase modulator facing the fiber end. By way of example, the phase modulator or its waveguide may be designed for beams with a beam width (FWHM) of between 3 μm and 10 μm. The spot-size converter may provide coupling between the fiber and the phase modulator that is as loss free as possible. A spot-size converter may further also be disposed at the output side of the phase modulator, i.e., facing the optical unit of the measuring head. The phase modulator and the spot-size converter may both be integrated in a photonic chip.

In a further aspect, the invention further relates to a measuring head for a distance measuring arrangement as described above. The measuring head comprises a housing, a fiber-optic coupling, a phase modulator and an optical unit. In particular, the phase modulator of the distance measuring arrangement is only disposed in said measuring head and integrated in the latter. The fiber-optic coupling of the measuring head facilitates a fiber-optic connection and separation from the remaining distance measuring arrangement. This allows one and the same distance measuring arrangement to be provided with different measuring heads. In particular, the distance measuring arrangement can be configured with a plurality of measuring heads, each with a different configuration. These can differ from one another by their specific optical configuration, in particular in the type of their respective phase modulators.

All of the above-described features of the distance measuring arrangement that relate to the phase modulator and/or the measuring head and/of the optical unit of the measuring head apply equally to the measuring head intended to be considered in isolation.

According to a further aspect, provision is further made of a method for determining a distance from an object. Here, the method comprises the steps of producing at least one first monochromatic light beam, capable of interference, with a first wavelength, and the step of producing at least one second monochromatic light beam, capable of interference, with a second wavelength. Here, the first and second wavelengths differ. In a further step, the at least first light beam and the at least second light beam are coupled or combined with one another in a common measurement beam. Consequently, the common measurement beam contains a plurality of spectral components, each capable of interference when considered on their own.

Subsequently, the measurement beam is spatially divided into a reference beam and into a signal beam. The reference beam propagates along a reference path and the signal beam propagates along a signal path. Further, the method comprises the step of modulating the phase of the signal beam periodically in time by means of a phase modulator. The phase modulator is arranged in the signal path.

Typically, the method still comprises further steps that are necessarily carried out when using the above-described distance measuring arrangement. In particular, provision is made for the method to be carried out using the above-described distance measuring arrangement and for the above-described distance measuring arrangement to be embodied to carry out the method described here. In this respect, all of the above-described features, advantages and explained functions of the distance measuring arrangement equally apply to the method provided here, and vice versa.

The method may further comprise the step of combining a signal beam that has been reflected by the object and the reference beam to form an evaluation beam. The reflected signal beam can likewise propagate through the phase modulator and accordingly receive a further phase modulation. The evaluation beam formed thus can finally be divided into its individual spectral components, which are capable of interference when considered on their own. The individual spectral components of the evaluation beam can subsequently be detected by means of separate detectors.

The detectors are typically embodied to measure an intensity of the evaluation beam or of the spectral components thereof. The evaluation beam further carries an interference pattern or phase information between the reference beam and the reflected signal beam. This change is also recognizable at the detector of the detector arrangement by virtue of the phase of the signal beam being modulated, i.e., changed, thus periodically in time by means of the phase modulator.

According to a further configuration, provision is made, in particular, for the evaluation beam or its spectral components to be detected in time averaged fashion or over a predetermined time period while the phase of the signal beam is modulated. This time averaged intensity of the evaluation beam, captured by means of the detectors, consequently facilitates a particularly precise measurement of the relative phase angle between the reflected signal beam and the reference beam. This can increase the precision of the phase measurement and hence also the precision of the distance measurement.

The specific phase modulation undertaken by means of the phase modulator is naturally known to a controller of the distance measuring arrangement. It is taken into account during the interferometric and/or wavelength-selective capture and evaluation of the evaluation beam.

According to a further aspect, the invention further relates to a computer program for determining a distance from an object. Here, the computer program is executable by an evaluation unit or by a controller that is coupled for data transfer with an above-described distance measuring arrangement. The computer program comprises program means for actuating a phase modulator that is arranged in the signal path of the distance measuring device.

The program means for actuating the phase modulator are configured to modulate the phase of the signal beam periodically in time. In particular, the program means are embodied to continually and continuously modulate the phase of the signal beam. By way of example, the program means are configured to modulate the phase of the signal beam in sinusoidal and/or time-periodic fashion. The computer program further comprises program means for interferometric and/or wavelength-selective evaluation of an evaluation beam captured by means of a detector arrangement. In particular, the program means for the evaluation of the captured evaluation beam is configured to integrate an intensity signal present at a detector of the detector device over time and finally to average said signal over time. This is because a time-integrated detection signal is characteristic for the relative phase angle between the respective spectral components of the reflected signal beam and of the reference beam.

In particular, the computer program is performable by the evaluation unit or by the controller of the above-described distance measuring arrangement. In this respect, all above-described features, advantages and functions of the distance measuring arrangement also equally apply to the computer program, and vice versa.

BRIEF DESCRIPTION OF THE DRAWING FIGURES

Further objects, features and advantageous configurations of the distance measuring arrangement, of the method for determining a distance from an object and of the computer program are explained in the following description of an exemplary embodiment illustrated in the accompanying drawing figures.

DETAILED DESCRIPTION OF EXEMPLARY EMBODIMENTS

Figure 1:
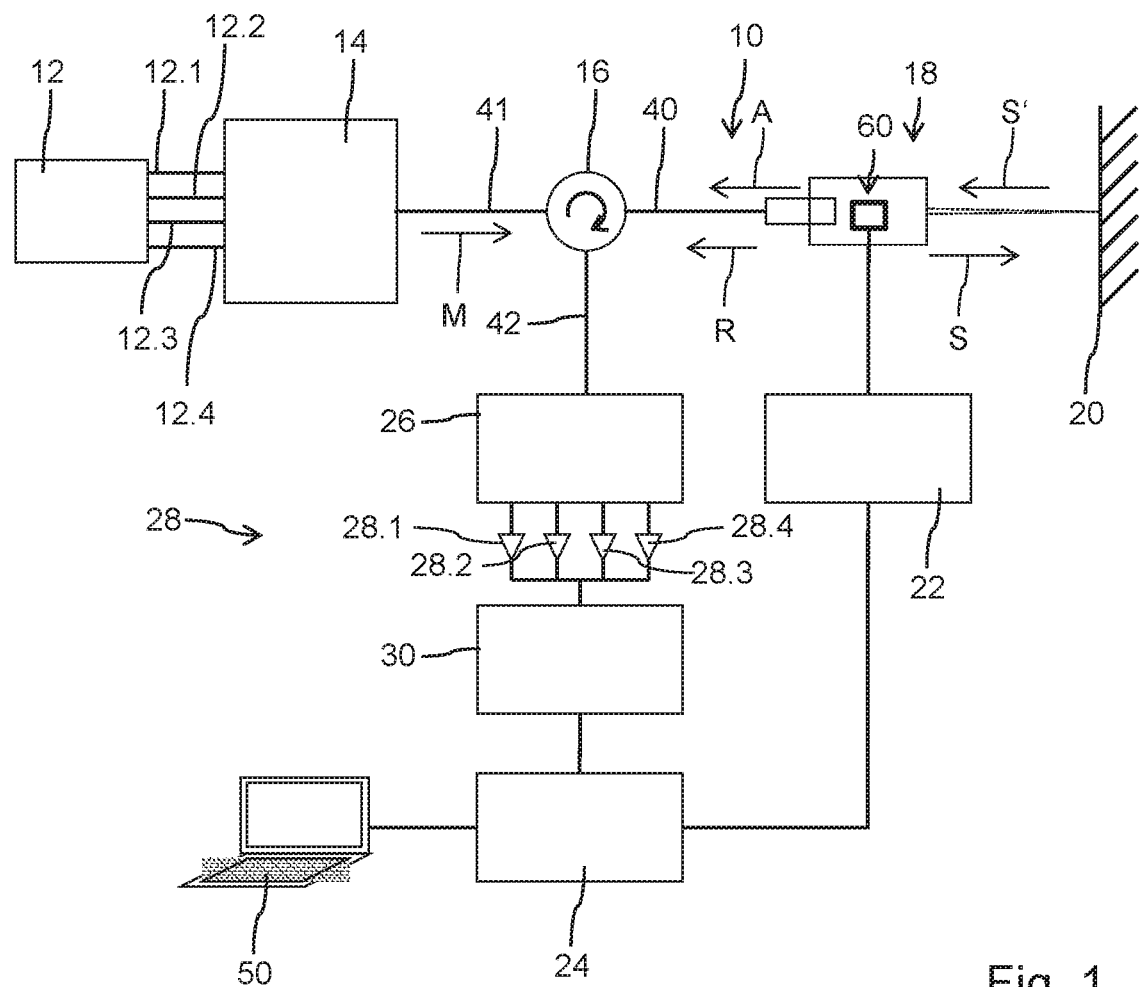
FIG. 1 shows a block diagram of a distance measuring arrangement according to an exemplary embodiment of the present invention.

The block diagram of FIG. 1 schematically illustrates a distance measuring arrangement 10 according to an exemplary embodiment of the present invention. The distance measuring arrangement 10 is configured as a multi-wavelength interferometer. The distance measuring arrangement 10 comprises a light source 12 for producing at least one first monochromatic, interference-capable light beam 12.1 and at least one second monochromatic light beam 12.2 which is capable of interference. The first light beam 12.1 and the second light beam 12.2 each have a first and a second wavelength, which differ.

The light source 12 can be embodied, in particular, to produce further monochromatic light beams which are capable of interference, for example a third light beam 12.3 and a fourth light beam 12.4. To this end, the light source 12 may itself comprise a plurality of laser light sources, which are respectively embodied to produce the at least one first and second light beam, but also at least one third and/or fourth light beam with different wavelengths. The wavelengths of the interference-capable light beams producible by the light source 12 typically lie in the infrared range. They may lie in a range between 1520 nm and 1630 nm.

The distance measuring arrangement 10 further comprises a multiplexer 14, by means of which the different light beams 12.1, 12.2, 12.3, 12.4 are coupled into a common measurement beam M or are combinable to form a common measurement beam M. The common measurement beam M may comprise at least two monochromatic spectral components, which are capable of interference when considered on their own. The light source 12 may likewise be coupled to the multiplexer 14 in fiber-optic fashion.

In particular, the common measurement beam M may comprise up to four different spectral components, each of which are capable of interference. The multiplexer 14 can be coupled in fiber-optic fashion to the light source 12. In particular, the multiplexer 14 can have a fiber-optic implementation. The output of the multiplexer 14 may comprise a single optical fiber 41, which opens into a coupler 16. The coupler 16, too, can be based on a fiber-optic concept. By way of example, it may comprise a fiber-optic circulator. An output of the coupler 16 is optically coupled to a measuring head 18 by way of a fiber 40. For other configurations of the distance measuring arrangement 10, the coupler 16 may also be configured as a partly reflecting mirror or as a beam splitter.

Figure 3:
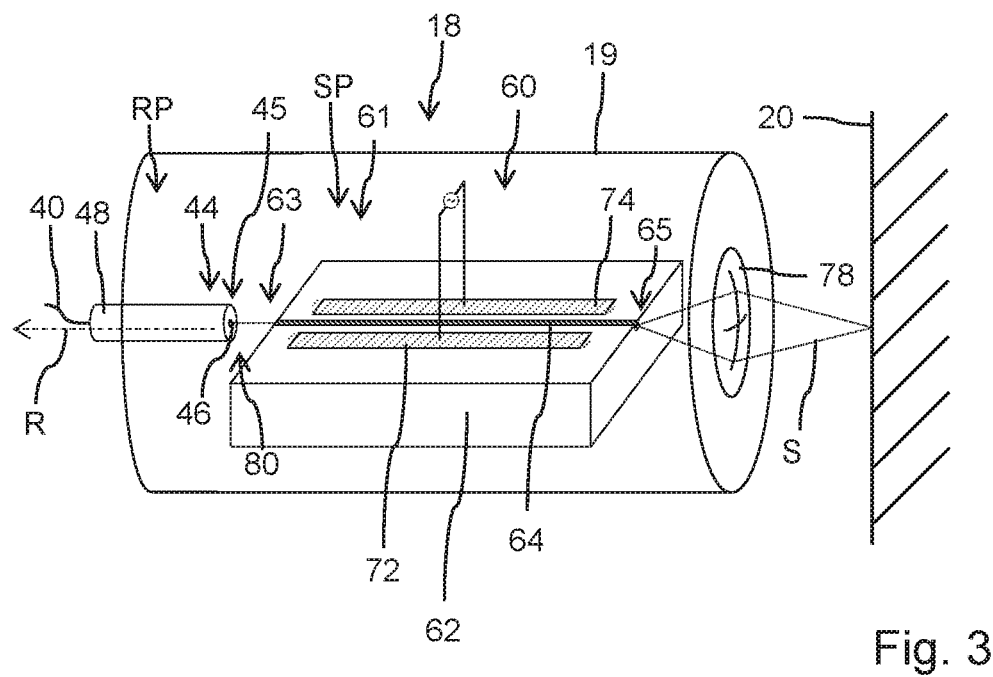
FIG. 3 shows a schematic and perspective illustration of a measuring head of the distance measuring arrangement.
Figure 4:
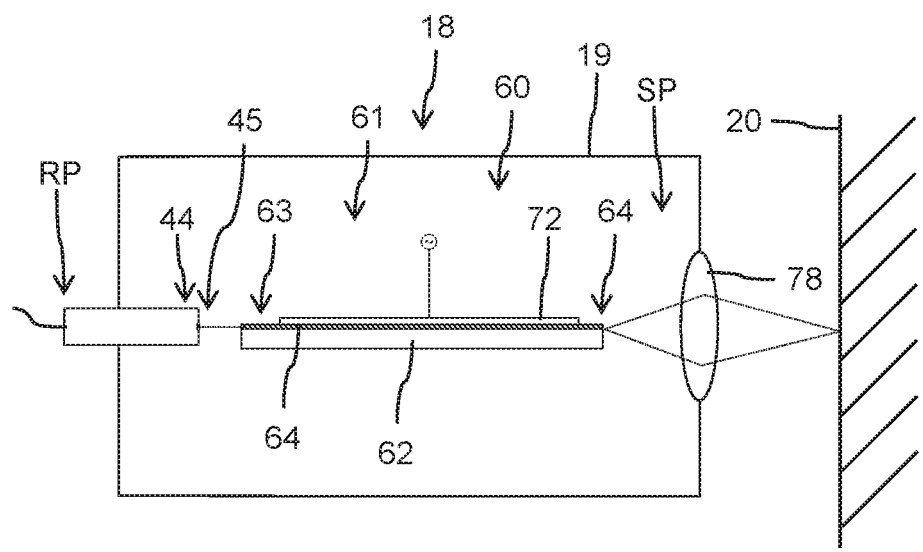
FIG. 4 shows a side view of the measuring head according to FIG. 3.
Figure 5:
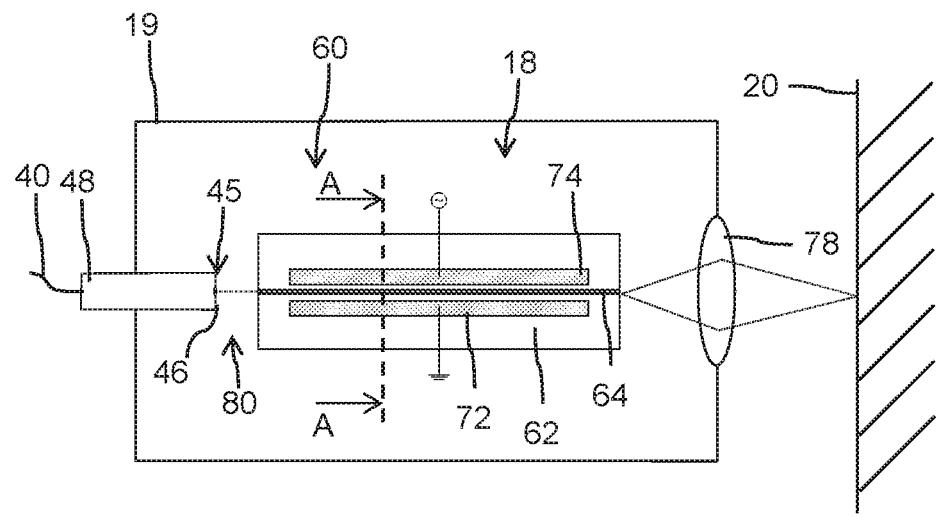
FIG. 5 shows a plan view of the measuring head according to FIGS. 3 and 4 from above.
Figure 6:
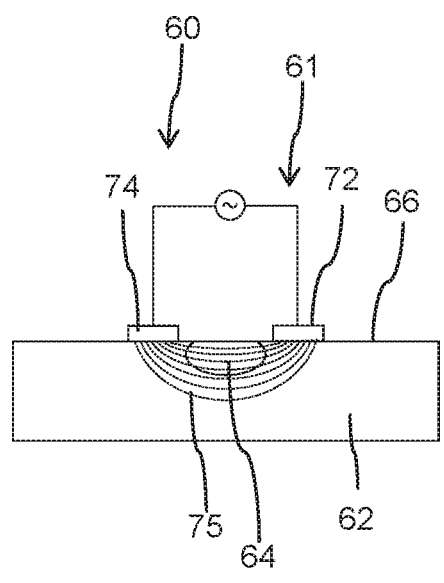
FIG. 6 shows a cross section taken along A-A according to FIG. 5 through the crystal body.

A further input of the coupler 16 is optically coupled to a detector arrangement 28 by way of an optical fiber 42. The measuring head 18 is sketched out in more detail in FIGS. 3 to 5. The measuring head 18 comprises a housing 19. The optical fiber 40, which is connected to an end of the coupler 16, opens into the interior of the housing 19 of the measuring head 18. The fiber 40 may comprise a fiber sleeve 48 for a defined connection.

The optical fiber 40 ends within the housing 19 of the measuring head 18. It may have a fiber end 44, which is fastened in the fiber sleeve 48. Further, the fiber sleeve 48 can be securely connected to the housing 19 of the measuring head 18. The fiber end 44 has a fiber end face 46. In the present case, the fiber end face 46 acts both as an output coupling element 45 and as an input coupling element 80. As it were, the fiber end 44 or the fiber end face 46 separates the measurement beam M arriving from the coupler 16 into a signal beam S and into a reference beam R. The reference beam is reflected back by the fiber end face 46. Consequently, it propagates back along the reference path RP into the coupler 16 via the optical fiber 40.

The signal beam S emanating from the fiber end 44 and consequently emanating from the fiber end face 46 propagates along a signal path SP and through a phase modulator 60. At the output of the phase modulator, the sensor head 18 comprises an optical unit 78, for example in the form of a lens or a lens system, by means of which the signal beam S is focusable on a reflecting surface of the object 20. From there, the signal beam S is at least partly reflected. The signal beam S' that has been reflected by the object 20 can be coupled back into the phase modulator 60 by the optical unit 78, in the opposite direction to the original signal beam S, and can propagate through the phase modulator 60 in the opposite direction to the original signal beam S.

Thereupon, the reflected signal beam S' can be coupled back into the optical fiber 40 by the input coupling element 80. The reference beam R and the reflected signal beam S' can interfere with one another in the optical fiber. The interference pattern arising in the process or the relative phase angle between the reflected signal beam S' and the reference beam R provides information about the distance between the output coupling element 45 and the reflecting surface of the object 20.

The input coupling element 80 can likewise be implemented by the fiber end face 46. In the present configuration, the fiber end face 46 acts both as output coupling element 45 and as input coupling element, by means of which a reference beam R and a signal beam S are separated from one another proceeding from a measurement beam M and by means of which a reflected signal beam S' can be combined with the reference beam again. The present configuration is purely exemplary. Various other configurations or other interferometer implementations for the distance measuring arrangement 10 are conceivable, for example according to the Mach-Zehnder or Michelson principle.

There is a superposition of the reference beam that propagates along the reference path RP from the output coupling element 45 or from the fiber end face 46 through the optical fiber 40 in the direction of the coupler 16 and the signal beam S' that has been reflected by the surface of the object 20 and that propagates along the signal path SP. The superposition of the reference beam R and of the signal beam S' reflected by the object 20 is referred to as evaluation beam A below.

The evaluation beam A propagates from the measuring head 18 to the coupler 16 in the optical fiber 40. In the coupler 16, the evaluation beam A is guided to the detector arrangement 28 by the further optical fiber 42. The detector arrangement 28 comprises a demultiplexer 26, which spatially separates the interference-capable spectral components of the evaluation beam A and supplies these individually to the downstream detectors 28.1, 28.2, 28.3, 28.4. Thus, the detector 28.1 can be matched to the first wavelength of the first light beam 12.1. The further detector 28.2 can be matched to the second wavelength of the at least second light beam 12.2. The same applies to the third detector 28.3 and to the fourth detector 28.4. The wavelengths or the spectral components of the evaluation beam, which are each detectable and measurable separately by the individual detectors 28.1, 28.2, 28.3 and 28.4 correspond to the wavelengths of the light beams produced by the light source 12.

The detector arrangement 28 further comprises a data capture unit 30, which prepares the signals of individual detectors 28.1, 28.2, 28.3, 28.4 from a measurement-technical point of view. By way of example, the data capture unit 30 can be configured as an FPGA (field programmable gate array). Typically, the data capture unit comprises one or more analog-to-digital converters, by means of which the analog signals that are producible by the individual detectors 28.1, 28.2, 28.3 or 28.4 are convertible into digital signals.

By way of example, if a total of four interference-capable light beams 12.1, 12.2, 12.3, 12.4 having different wavelengths are provided, there are four spectral components or four partial beams of the measurement beam in each case. Consequently, the reference beam also has four individual partial beams, each with a different wavelength. The same applies to the signal beam and to the signal beam that has been reflected by the object. Thereupon, the evaluation beam can likewise comprise four pairs of mutually interfering partial beams of the reference beam and of the reflected signal beam.

The data capture unit 30 is further coupled to a controller 24 of the distance measuring arrangement 10. The controller 24 is coupled to an amplifier 22 which, in turn, amplifies a control signal for the phase modulator 60. The controller 24 is configured to produce a control signal for the phase modulator 60. Further, the controller 24 is couplable for data transfer to an external evaluation unit 50. By way of example, the external evaluation unit 50 can be embodied as a computer, e.g. as a Tablet PC. Further, the external evaluation unit 50 may also be directly coupled to the data capture unit 30 in order to process the data signals recorded by the data capture unit 30.

In particular, the controller 24 is configured to produce a control signal that varies periodically in time, the latter being amplified in terms of its signal amplitude by means of the amplifier 22. The amplified control signal is fed to the phase modulator 60 in order to respectively modulate or vary the phase of the control signal S or of the reflected signal beam S' periodically in time. There is no relative movement, or only negligible relative movement, between the measuring head 18 and the object 20 during the temporal modulation. The phase modulation leads to a periodically changing intensity distribution at the detectors 28.1, 28.2, 28.3, 28.4. The accurate phase angle for the relevant wavelength or for the relevant light beams of different wavelengths can be determined by way of averaging the intensity modulation at the detectors over time.

Figure 2:
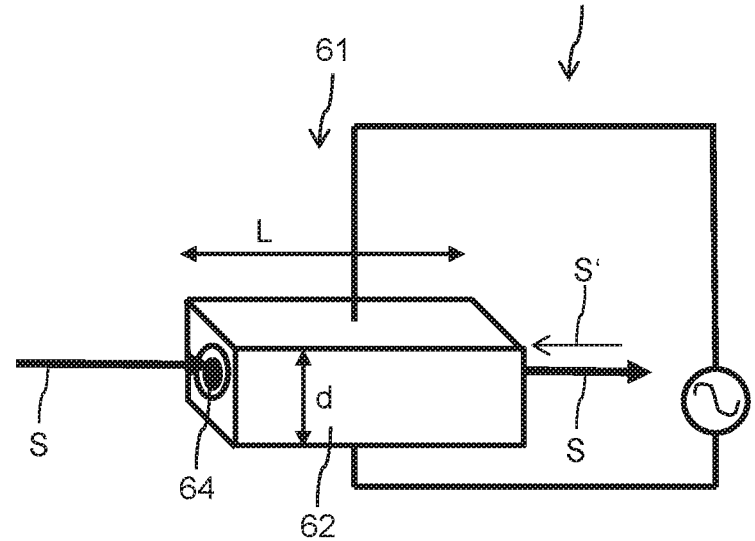
FIG. 2 shows a schematic illustration of a phase modulator comprising a crystal body, said phase modulator being configured as an electro-optic modulator.

FIG. 2 schematically sketches out the functionality of the phase modulator 60. The phase modulator 60 is configured as an electro-optic modulator 61. It comprises a crystal body 62 with a waveguide 64 that extends through the crystal body 62 in the longitudinal direction. The signal beam striking the crystal body 62 from the left propagates through the crystal body 62 in the longitudinal direction. An electric field is applied to the crystal body 62 in the transverse direction, i.e., perpendicular to the direction of propagation of the signal beam S. The electro-optic modulation leads to a refractive index change along the waveguide 64 according to the following rule:

$$\varphi(t) = (2\pi/\lambda) L \Delta n(t) = (\pi/\lambda) n^3 r V(t)(L/d),$$

where $\lambda$ is a wavelength of the light beam, $V(t)$ is a time-varying voltage produced by the controller 24, d is the distance between the electrodes, L is the length of the propagation path of the light beam through the crystal body and $\Delta n(t)$ is the voltage-induced change in the refractive index. The latter is determined from n, the non-modified refractive index of the material in the respectively selected geometry, where r represents the effective electro-optic tensor of the crystal body, which depends on the respective crystal alignment.

The illustration according to FIGS. 3 to 6 further shows that the waveguide 64 is embodied or disposed on an external surface, consequently at an upper side 66 of the crystal body 62. To the left and right of the waveguide 64, as viewed in the direction of propagation, there are two electrodes 72, 74, which extend both parallel to one another and parallel to the waveguide 64. The electrodes 72, 74 extend over approximately the entire longitudinal extent of the waveguide. In particular, the waveguide 64 extends through the entire crystal body 62. It has an end 63 facing the fiber end 44, which opens into an end face of the crystal body 62 facing the fiber end 44. On the opposite side, the waveguide 64 has an end 65 facing the optical unit 78, said end opening into an end face of the crystal body 62 facing the optical unit 78.

The waveguide 64 and the two electrodes 72, 74 are situated on one and the same surface 66 of the crystal body 62. As shown in the cross section according to FIG. 6, in particular, the electric field lines 75 that extend in approximately arcuate form between the electrodes 72, 74 can extend approximately in transverse fashion through the waveguide 64. That is to say, the direction of the field lines 75 extends approximately perpendicular to the longitudinal direction of the waveguide 64.

By applying an AC voltage to the electrodes 72, 74, a corresponding phase modulation can be modulated onto the signal beam S or onto the reflected signal beam S', virtually without time delay. Modulation frequencies in the region above 1 kHz, above 2 kHz, above 5 kHz or else above 10 or 100 kHz can be realized by means of the electro-optic phase modulator 60. This allows the measurement accuracy and measurement speed to be increased, particularly for the purposes of scanning a surface of the object 20. A modulation frequency of more than 1 kHz or several kilohertz facilitates quick scanning of a surface of the object 20. The distance from the individual measurement points on the surface of the object can be ascertained more quickly with increasing modulation frequency. In this respect, increasing the modulation frequency of the phase modulation allows an increase in the speed of a scanning movement of the measuring head 18 relative to the object 20, for example in order to measure the surface of the latter.

Figure 7:
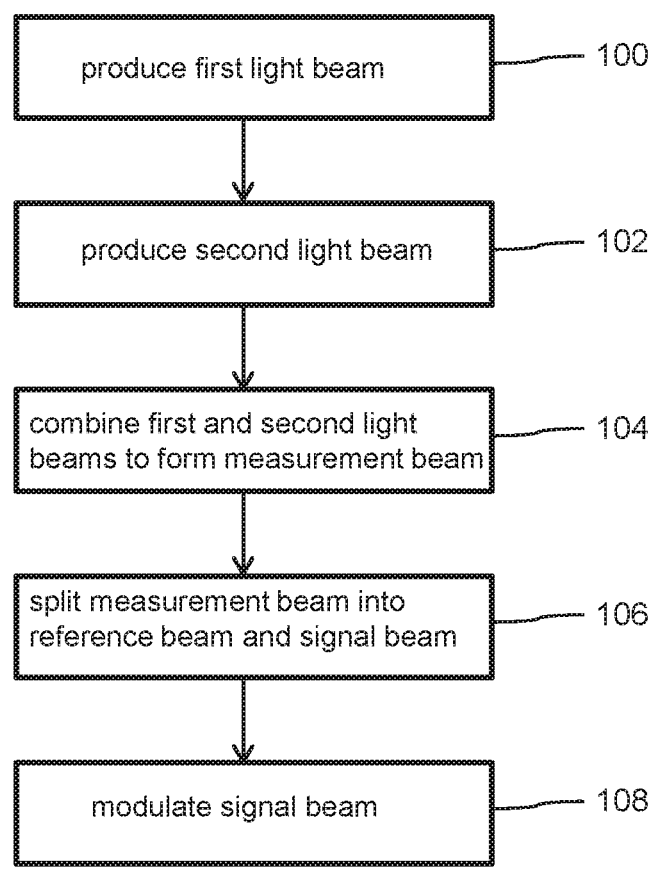
FIG. 7 shows a flowchart of a method for determining a distance from an object according to an exemplary embodiment of the present invention.
Figure 8:
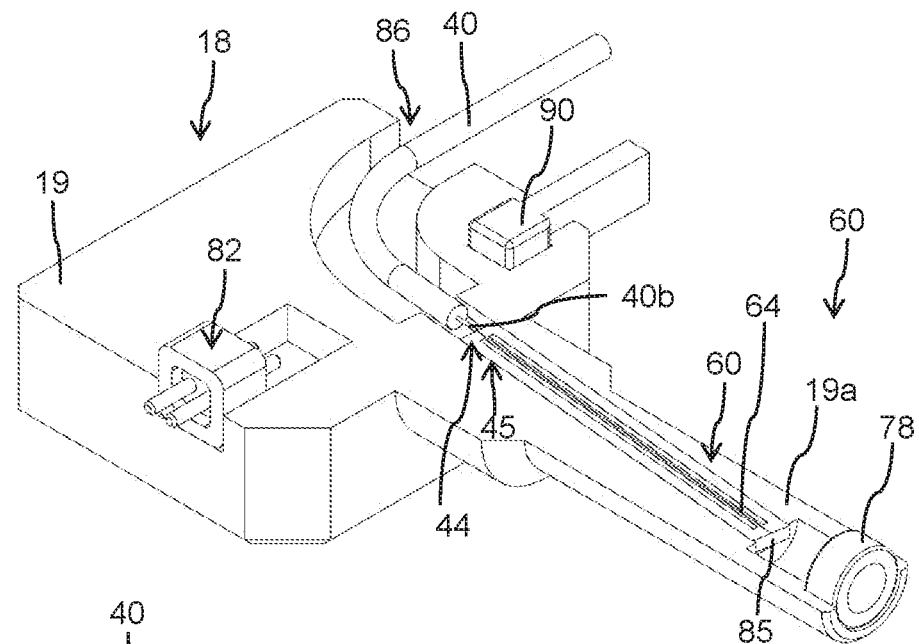
FIG. 8 shows a cut, perspective illustration of a configuration of the measuring head according to FIG. 3.

Finally, FIG. 7 schematically illustrates a flowchart of a method for determining a distance from an object 20 according to an exemplary embodiment of the present invention. In a first step 100, at least one first monochromatic light beam 12.1, capable of interference, with a first wavelength is produced, for example by means of the light source 12. In the subsequent step 102, at least one second monochromatic light beam, capable of interference, with a second wavelength is produced at the same time as the production of the first light beam, with the second wavelength differing from the first wavelength.

In the subsequent step 104, the first light beam and the second light beam are coupled or combined or superposed to form a common measurement beam. The measurement beam formed thus is split into a reference beam R and into a signal beam in the subsequent step 106. The reference beam propagates along a reference path RP and the signal beam S propagates along a signal path SP. In the further step 108, the signal beam is modulated periodically in time in respect of its phase angle by means of the phase modulator.

According to the use of the above-described distance measuring arrangement 10 as intended, further optional method steps provide for a superposition of the signal beam S' that has been reflected by the object 20 and of the reference beam R and for this to produce an evaluation beam A that contains an interference pattern.

The evaluation beam A is spatially split again in respect of its spectral components in a manner corresponding to the at least first and second different wavelengths. Thereupon, the individual spectral components are detected separately by means of a detector arrangement 28. Here, the respective intensities are measured at the detector while the signal beam continues to be modulated periodically in time. This leads to a corresponding modulation of the light intensity that is measurable at the individual detectors. Finally, a precise statement about the relative phase angle of the respective spectral component of reflected signal beam and reference beam can be made by way of time averaging, said statement in turn allowing conclusions to be drawn about the absolute distance between the output coupling element 45 and the surface of the object 20.

FIGS. 8-11 show an implementation of a measuring head 18, which comprises a housing 19 in which a phase modulator 60 and an optical unit 78 are disposed. An optical fiber, more particularly a glass-based optical fiber 40, can be detachably disposed on the measuring head 18 by means of a fiber coupling 86. However, said fiber may also be non-detachably and securely connected to the measuring head 18. The housing 19 comprises a protrusion 19a, at the free end of which the optical unit 78, for example in the form of a spherical or aspherical lens 78, is disposed. By way of example, the fiber coupling 86 can be configured as a fiber-implemented plug-in connection.

Figure 12:
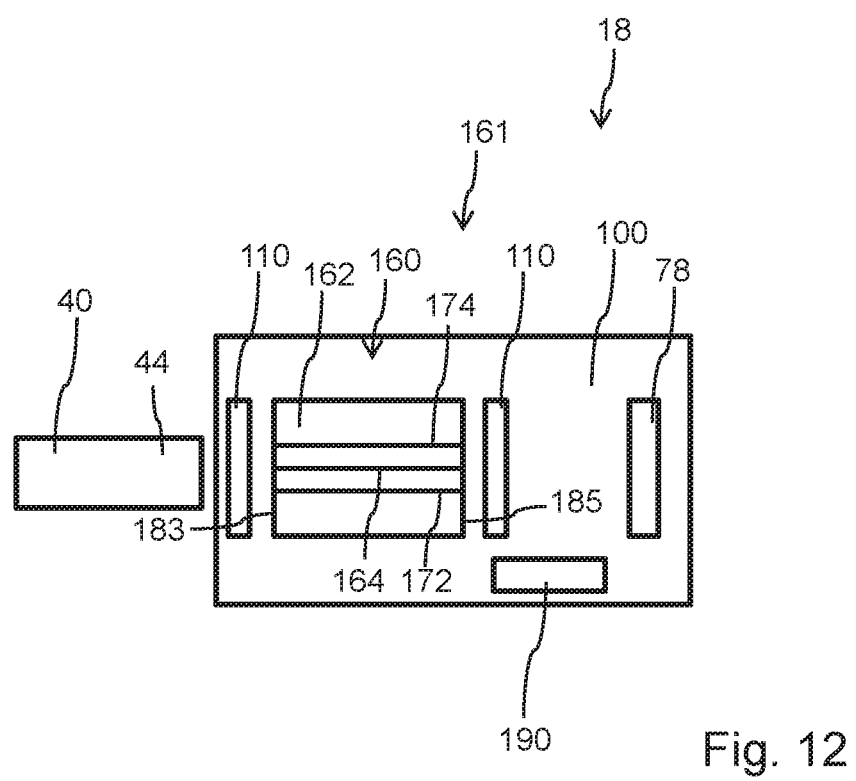
FIG. 12 shows a further schematic illustration of a measuring head with a photonic chip.

In the present case, the phase modulator 60 has a longitudinally extended rectangular geometry. By way of example, the phase modulator 60 can be configured as a lithium niobate crystal, as described above in FIGS. 3-6. Alternatively, the phase modulator 60 may comprise a plurality of layers of n-doped and/or p-doped semiconductor materials. The phase modulator can be implemented as an integrated photonic phase modulator, for example in a photonic chip 161 as shown in FIG. 12.

The fiber end 44 facing the phase modulator 60 can be mechanically connected, in particular directly, to an entrance or end face 83 of the phase modulator 60. In particular, it is conceivable for an exposed fiber end 44 to be connected by means of an adhesive to the end face 83 of the phase modulator 60, for example of the crystal body 62, or to the end face 183 of a semiconductor layer structure 162 as indicated in FIG. 12. Coupling between the phase modulator 60 and the fiber end 44 that is as direct as possible is advantageous for a loss-free signal transmission. In particular, a so-called index matching adhesive, which is matched to the refractive index of the fiber 40 and/or to the refractive index of the waveguide 64, is provided for the adhesive connection between the fiber end 44 and an entrance face 83 of the phase modulator 60.

The measuring head 18 can optionally be configured with a temperature sensor 90. The latter can be signal-connected to the controller 24 of the distance measuring arrangement 10. The temperature of the measuring head 18 and/or of the phase modulator 60 can be ascertained precisely by means of the temperature sensor 90. This facilitates active temperature regulation, for example using a further optional cooling and/or heating element (not illustrated), or else a purely computational compensation of possible influences of the temperature on the measurement signal.

Further, the measuring head 18 comprises an electric plug-in connector 82, which facilitates electrical contacting of the electrodes 72, 74 with the amplifier 22. The electrical connection between the plug-in connector 82 and the electrodes 72, 74 extending along the waveguide 64 is not explicitly shown for reasons of an illustration that is as clear as possible.

Figure 9:
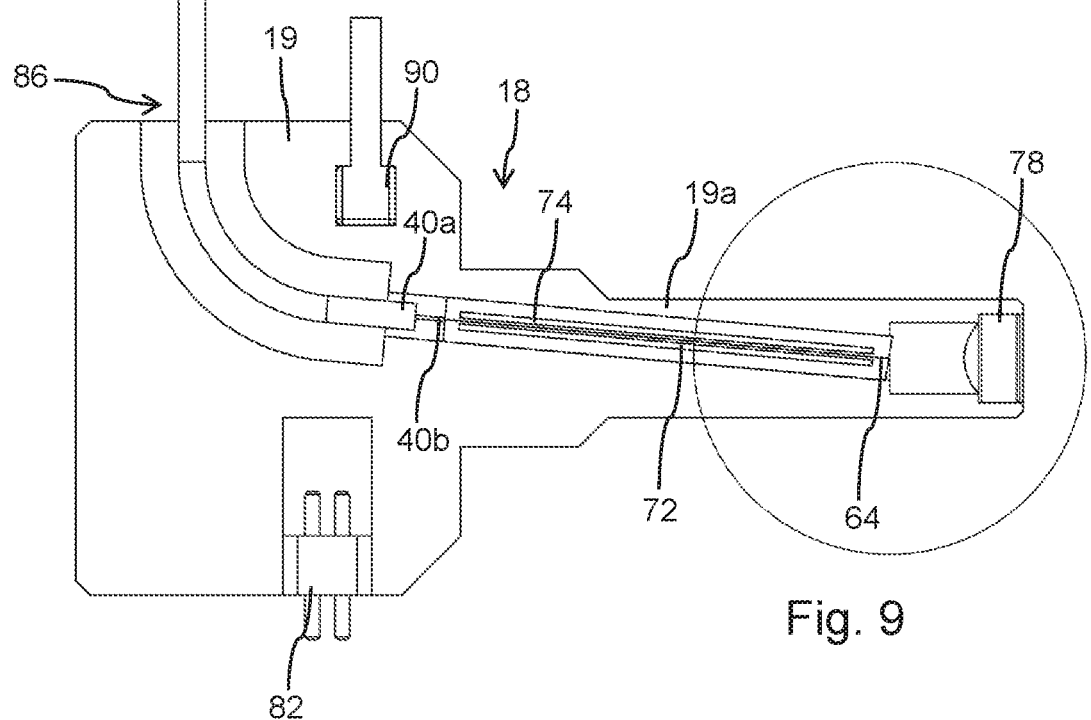
FIG. 9 shows a plan view of the measuring head according to FIG. 8 from above.
Figure 10:
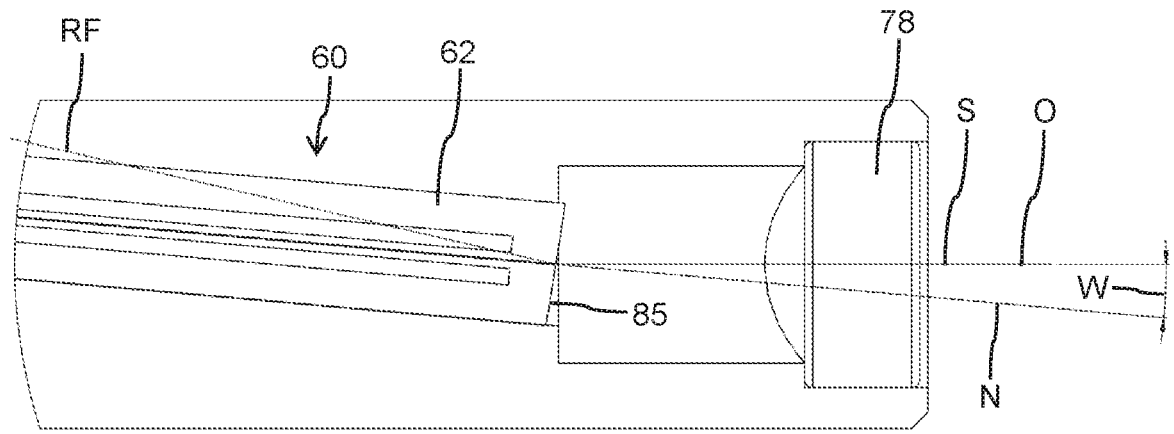
FIG. 10 shows a magnified illustration of the measuring head in the region of the interface between the phase modulator and optical unit.

As can be identified on the basis of FIG. 9, in particular, a longitudinal axis of the phase modulator 60 is slightly inclined in relation to an optical axis O of the optical unit 78. Said angle of inclination W is approximately 5° in the illustration according to FIG. 10. It may vary between 3° and 10°. In a manner corresponding to this angle of inclination W, the phase modulator 60 also has an inclined alignment in relation to the longitudinal extent of the protrusion 19a. Equally, the surface normal of the end face 85 can be aligned with an inclination through the angle W in relation to the longitudinal axis of the phase modulator 60, for example of the crystal body 62.

The surface normal of an end face 85 of the phase modulator 60, facing the optical unit 78, likewise extends at an angle of inclination W. Any inclined configuration of the exit-side end face 85 of the phase modulator 60 leads to a back reflection RF of the signal beam S directed on the object, said back reflection invariably arising at the exit surface 85, extending away from the signal beam S' that has been reflected by the object 20, and consequently said back reflection is not superposed on the signal beam S'. Consequently, an impairment by a back reflection RF of the signal beam S' that has been reflected by the object 20 and coupled back into the phase modulator 60 by way of the optical unit 78 can be avoided or reduced to a minimum.

Figure 11:
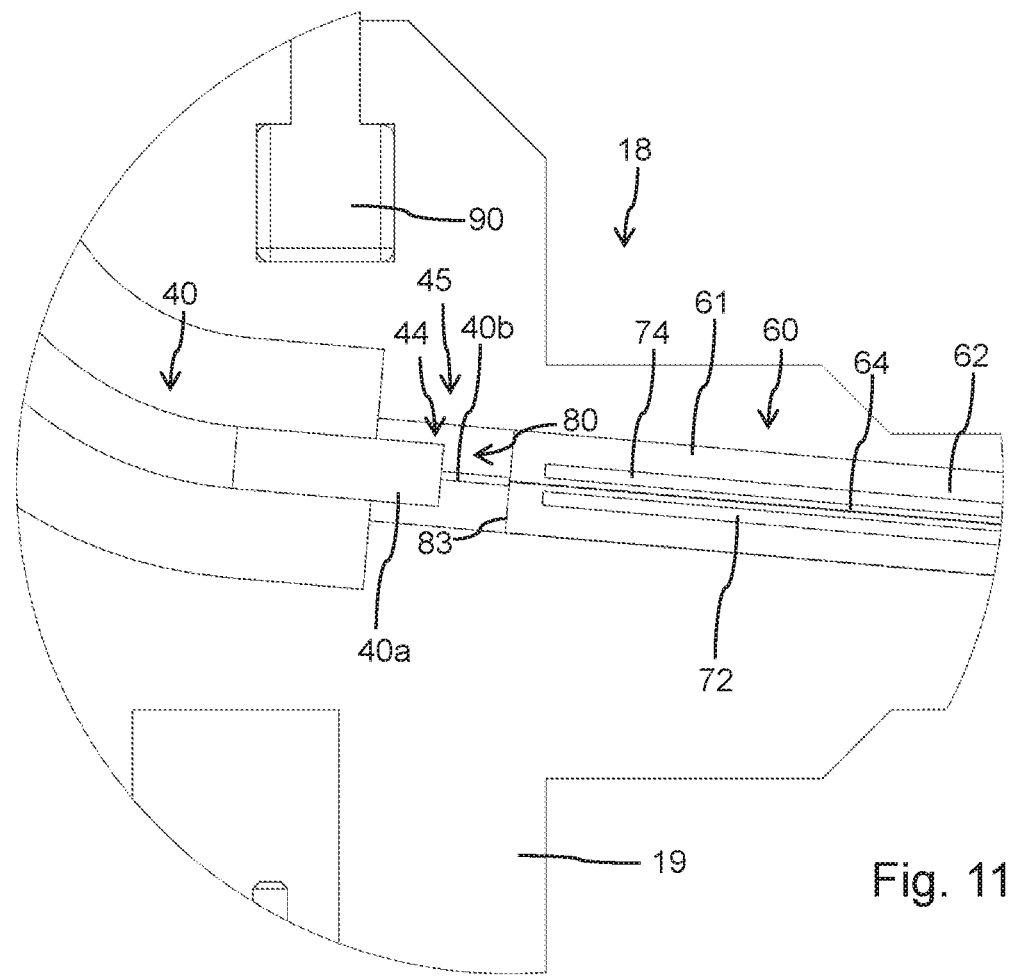
FIG. 11 shows a magnified illustration of the measuring head in the region of the interface between the optical fiber and phase modulator.

FIG. 11 shows a mechanical link of the fiber end 44 to the end face 83 of the crystal body 62. A fiber core 40b that has been exposed from its fiber cladding 40a is in direct mechanical contact with the end face 83 of the phase modulator 60, more particularly in direct mechanical contact with the waveguide 64 of the phase modulator 60. An index matching adhesive may be provided for the mechanical link.

The further illustration according to FIG. 12 shows, in purely schematic fashion, a further implementation of a phase modulator 160, which is integrated in a so-called photonic chip 161. The photonic chip 161 can be disposed in or on the measuring head 18. The photonic chip 161 comprises a substrate 100 with a layer structure 162 made of a plurality of differently doped semiconductor layers. A waveguide 164 is likewise situated in the layer structure 162. The fiber end 44 can likewise be directly adhesively bonded to the layer structure 162. However, the fiber end 44 may also be optically coupled to the photonic chip 161 and to the phase modulator 160 while maintaining an air gap.

Further, the photonic chip may comprise at least one so-called spot-size converter 110, which is disposed between the fiber end 44 and an entrance-side end face 183 of the phase modulator 160. Equally, a further spot-size converter 110 may also be provided between an exit-side end face 185 and the optical unit 78. Likewise, as described above in relation to the configuration in FIG. 10, a surface normal of the exit surface of the spot-size converter 110 facing the optical unit 78 may likewise be aligned with an inclination at a predetermined angle W in relation to the optical axis of the optical unit 78 in order to avoid back reflections into the phase modulator 160.

A spot-size converter can be used to match the beam geometry predetermined by the fiber 40, in particular a beam dimension or a beam cross section, to the requirements of the waveguide 164. Typically, the beam size or beam geometry emanating from the fiber 40 can be reduced for the waveguide 164 by means of the spot-size converter 110 that is likewise disposed on the chip 161. One or more electrodes 172, 174 for a refractive index modulation to be induced electrically can be provided in or at the layer structure 162. The phase modulator 160 configured as a photonic chip can be configured, in particular, as an electro-optic phase modulator or as a thermo-optic phase modulator.

The implementation as a photonic chip facilitates manufacturing that is suitable for mass production and particularly cost-effective. Thus, a plurality of such phase modulators 160 can be produced and configured simultaneously on a single wafer within the scope of one or more process steps.

The fiber end 44 possibly directly connected to the front-side end face 83, 183 of the phase modulator 60, 160 can act both as an output coupling element 45 and as an input coupling element 80 for the reference beam and the reflected signal beam, respectively. The end face 83, 183 of the phase modulator 60, 160 can be provided or coated with a mirror layer. In the case of an implementation of a photonic chip 161, a corresponding edge of the chip 161, i.e., the edge of the chip facing the fiber 40, can act as a mirror face in order to form the reference beam or in order to split the measurement beam into the reference beam and signal beam. The mirror face can have a reflectivity of more than 30%, more than 50% and up to 99%.

Optionally, the phase modulator 160 shown in FIG. 12 can also be thermally coupled to a temperature sensor 190. The temperature sensor 190, which comprises a fiber Bragg grating, for example, may be implemented as a photonic integrated circuit and may be disposed on the same substrate 100 as the phase modulator 160. Consequently, the temperature sensor 190 and the phase modulator 160 or the semiconductor layer structure 162 can be integrated together in the photonic chip 161. In a manner similar to the above-described temperature sensor 90, the temperature sensor 190 can be signal-coupled, or coupled for data transfer, with the controller 24.

That which is claimed is:

1. A distance measuring arrangement for determining a distance from an object, comprising:
    at least one light source for producing at least a first monochromatic light beam, capable of interference and with a first wavelength, and a second monochromatic light beam, capable of interference and with a second wavelength;
    a multiplexer for coupling or combining the first light beam and the second light beam into a common measurement beam;
    an output splitter for dividing the measurement beam into a reference beam and a signal beam, wherein the reference beam propagates along a reference path and wherein the signal beam propagates along a signal path; and
    a measuring head having a phase modulator disposed in or on the measuring head, wherein the phase modulator is arranged in the signal path and configured to modulate the phase of the signal beam periodically in time;
    wherein the measuring head comprises an optical lens configured for directing the signal beam to the object and/or for coupling a signal beam reflected by the object into the measuring head; and
    wherein an end face of the phase modulator facing the optical lens has a surface normal that is inclined in relation to an optical axis of the optical lens.

2. The distance measuring arrangement as claimed in claim 1, wherein the phase modulator comprises an electro-optic modulator.

3. The distance measuring arrangement as claimed in claim 2, wherein the electro-optic modulator comprises a crystal body and at least two electrically actuatable electrodes that are electrically connected to the crystal body.

4. The distance measuring arrangement as claimed in claim 3, wherein the crystal body comprises at least one of a lithium niobate crystal, a potassium dihydrogenphosphate crystal and a gallium arsenide crystal.

5. The distance measuring arrangement as claimed in claim 3, wherein the crystal body comprises a waveguide.

6. The distance measuring arrangement as claimed in claim 5, wherein the electrodes extend parallel to one another and along a longitudinal direction of the waveguide.

7. The distance measuring arrangement as claimed in claim 3, wherein the electrodes lie on a common surface of the crystal body.

8. The distance measuring arrangement as claimed in claim 1, wherein the measuring head is coupled to the multiplexer by an optical fiber.

9. The distance measuring arrangement as claimed in claim 1, wherein the phase modulator is coupled to the multiplexer by an optical fiber.

10. The distance measuring arrangement as claimed in claim 1, wherein the phase modulator is disposed between the output splitter and the optical lens in the signal path.

11. The distance measuring arrangement as claimed in claim 1, further comprising an input coupler configured for combining the reference beam and the signal beam that has been reflected by the object with one another to form an evaluation beam.

12. The distance measuring arrangement as claimed in claim 11, further comprising a detector arrangement for interferometric and/or wavelength-selective capture of the evaluation beam.

13. The distance measuring arrangement as claimed in claim 1, wherein the measuring head includes a temperature sensor.

14. The distance measuring arrangement as claimed in claim 1, wherein the phase modulator comprises a plurality of layers of n-doped and/or p-doped semiconductor materials selected from the group consisting of InP, GaAs, InGaAs, SiN and/or silicon on insulator (SOI).

15. A non-transitory computer readable medium on which program instructions are encoded for determining a distance from an object when executed by a controller that is data-coupled to the distance measuring arrangement as claimed in claim 1, the non-transitory computer readable medium comprising:
    first executable program instructions for actuating the phase modulator that is arranged in the signal path of the distance measuring arrangement, wherein the first executable program instructions are configured to modulate the phase of the signal beam periodically in time; and second executable program instructions for interferometric and/or wavelength-selective evaluation of an evaluation beam captured by means of a detector arrangement.

16. A measuring head for an interferometric distance measuring arrangement, wherein the measuring head comprises:
   a housing;
   a fiber-optic coupling for coupling the measuring head with at least one light source of the distance measuring arrangement;
   a phase modulator disposed in or on the measuring head and arranged in a signal path and configured to modulate the phase of a signal beam propagating along the signal path periodically in time; and
   an optical lens configured for directing the signal beam to an object and/or for coupling a reflected signal beam reflected by the object into the measuring head;
   wherein an end face of the phase modulator facing the optical lens has a surface normal that is inclined in relation to an optical axis of the optical lens.

17. A method for determining a distance from an object, comprising:
   producing a first monochromatic light beam, capable of interference and with a first wavelength;
   producing a second monochromatic light beam, capable of interference and with a second wavelength;
   coupling or combining the first light beam and the second light beam into a common measurement beam;
   dividing the measurement beam into a reference beam and into a signal beam, wherein the reference beam propagates along a reference path and wherein the signal beam propagates along a signal path; and
   modulating the phase of the signal beam periodically in time by means of a phase modulator that is arranged in the signal path;
   wherein the phase modulator is disposed in or on a measuring head that comprises an optical lens configured for directing the signal beam to the object and/or for coupling a signal beam reflected by the object into the measuring head; and
   wherein an end face of the phase modulator facing the optical lens has a surface normal that is inclined in relation to an optical axis of the optical lens.

\* \* \* \* \*